United States Patent [19]

Ogawa et al.

[11] Patent Number: 5,691,434
[45] Date of Patent: Nov. 25, 1997

[54] CURABLE ORGANOPOLYSILOXANE COMPOSITION

[75] Inventors: Masahiko Ogawa, Takasaki; Takamasa Toyoda; Kenichi Isobe, both of Annaka, all of Japan

[73] Assignee: Shin-Etsu Chemical Co., Ltd., Tokyo, Japan

[21] Appl. No.: 756,917

[22] Filed: Dec. 2, 1996

[30] Foreign Application Priority Data

Nov. 30, 1995 [JP] Japan ................... 7-336141

[51] Int. Cl.$^6$ .................................................. C08G 77/08
[52] U.S. Cl. ...................................... 528/15; 525/478
[58] Field of Search ......................... 528/15; 525/478

[56] References Cited

U.S. PATENT DOCUMENTS

| | | | |
|---|---|---|---|
| 3,445,420 | 5/1969 | Kookootsedes et al. | 528/15 |
| 4,336,364 | 6/1982 | Maxson | 528/15 |
| 4,721,764 | 1/1988 | Fujiki et al. | 528/15 |
| 5,118,772 | 6/1992 | Herzig et al. | 528/15 |
| 5,231,157 | 7/1993 | Herzig et al. | 528/15 |

*Primary Examiner*—Melvyn I. Marquis
*Attorney, Agent, or Firm*—Oblon, Spivak, McClelland, Maier & Neustadt, P.C.

[57] ABSTRACT

There is provided a curable organopolysiloxane composition comprising (A) an organopolysiloxane containing, in its molecule, at least two groups represented by the general formula (1):

$$CH_2=CH-(CH_2)_a-(OC_bH_{2b})_c-O- \quad (1)$$

wherein a is an integer of 1 to 8, b is an integer of 2 to 4, and c is an integer of 0 to 3; (B) an organohydrogenpolysiloxane containing, in its molecule, at least two hydrogen atoms each bonded to a silicon atom; (C) an addition-reaction retarder; and (D) a platinum family metal catalyst. The composition is fast in curing speed and superior in curing stability.

7 Claims, No Drawings

CURABLE ORGANOPOLYSILOXANE COMPOSITION

BACKGROUND OF THE INVENTION

1. Field of the Invention

The present invention relates to a curable organopolysiloxane composition fast in curing speed and a cured product, which is obtained from said composition, excellent in release properties from tacky substances.

2. Description of the Prior Art

Conventionally, curable organopolysiloxane compositions are used for providing release properties to various substrates, such as paper, synthetic films, woven fabrics and metal foils, and used as potting materials and sealants. As the curable organopolysiloxane compositions, there are proposed, for example, a condensation reaction curable type organopolysiloxane composition [e.g. Japanese Patent Publication (Kokoku) No. 35-13709] comprising a hydroxyl group-containing organopolysiloxane, organohydrogenpolysiloxane and a condensation catalyst such as tin, and an addition reaction curable type organopolysiloxane composition [e.g. Japanese Patent Publication (Kokoku) No. 49-26798] comprising a vinyl group-containing organopolysiloxane, organohydrogenpolysiloxane and a platinum compound. However, the condensation reaction curable type organopolysiloxane composition has the disadvantages that the curing speed is slow, heating at an elevated temperature and for a long time is required, the condensation reaction is accompanied by a volume shrinkage of the composition, and the pot life is short. While, the addition reaction curable type organopolysiloxane composition has a better curability than the condensation reaction curable type composition and result in less volume shrinkage when cured, nevertheless it has the disadvantage that, for example, when used for the surface-treatment of a substrate, foaming of the composition results, when cured, depending upon the kind of the substrate. Further, the addition reaction curable type composition has the disadvantage that when using a heat-softening (heat-shrinking) material as the substrate, the cured product shrinks or the glaze of the surface of the cured product decreases.

Thus, for the purpose of ameliorating these disadvantages, there has been proposed a curable composition using as a base component an organopolysiloxane containing a higher alkyl group [Japanese Patent Publication (Kokoku) No. 5-23308]. However, the curable composition has the problem that it is complicated to produce an intermediate (starting material) of the organopolysiloxane which is a base component. More specifically, a higher alkenylsilane, the intermediate, can result in multi-addition and is produced at an extremely low yield since the purification of the product is difficult. Also, there are the problems that an olefin source used in the production of the higher alkenylsilane is expensive and is difficult to be industrially available.

SUMMARY OF THE INVENTION

An object of the present invention is to provide a curable organopolysiloxane composition fast in curing speed comprising an organopolysiloxane as a base component, and an cured product thereof, said organopolysiloxane being extremely superior in addition-reactivity and being industrially readily available.

The present invention provides a curable organopolysiloxane composition comprising:

(A) an organopolysiloxane containing, in its molecule, at least two groups represented by the following general formula (1):

$$CH_2=CH-(CH_2)_a-(OC_bH_{2b})_c-O- \quad (1)$$

wherein a is an integer of 1 to 8, b is an integer of 2 to 4, and c is an integer of 0 to 3;

(B) an organohydrogenpolysiloxane containing, in its molecule, at least two hydrogen atoms each bonded to a silicon atom;

(C) an addition-reaction retarder; and (D) a platinum family metal catalyst.

Also, the present invention provides a cured product obtained by curing said composition.

The composition of the present invention is very fast in curing speed since the organopolysiloxane of component (A), which is a base component, has a high activity. Further, the composition is superior in curing stability and thus, even when curing conditions such as curing temperature and curing time were changed, the physical properties, for example, the releasability of the cured product from a tacky substance are little affected.

DETAILED DESCRIPTION OF THE PREFERRED EMBODIMENTS

The present invention will now be described in detail below.

Component (A)

The organopolysiloxane of component (A) used in the present invention serves as a base component for the composition of the invention and contains at least two groups represented by said general formula (1), per molecule. This organopolysiloxane may have some branched chains, but preferably it is substantially a straight chain. The organopolysiloxane includes, for example, an organopolysiloxane containing, in its molecule, at least two $R^1$ groups represented by said general formula (1), which is comprised of a $(R^1)(R^2)_2SiO_{1/2}$ unit and a $(R_2)_2SiO_{2/2}$ unit and optionally may contain at least one unit selected from the group consisting of a $R^1R^2SiO_{2/2}$ unit, a $R^1SiO_{3/2}$ unit, a $(R^2)_3SiO_{1/2}$ unit and a $R^2SiO_{3/2}$ unit wherein in said units, $R^1$ is as defined above, and $R^2$ is an unsubstituted or substituted monovalent hydrocarbon group free of any aliphatic unsaturated bond. Typical examples of the organopolysiloxane include a dimethylpolysiloxane blocked with an alkenyloxy-containing silyl group at the end of its molecular chain, such as a dimethylpolysiloxane blocked with a 5-hexenyloxydimethylsilyl group at the end, a dimethylpolysiloxane blocked with a 7-octenyloxydimethylsilyl group at the end, a dimethylpolysiloxane blocked with a β-(3-butenyloxy)ethoxydimethylsilyl group at the end; and a dimethylpolysiloxane blocked with either an alkyl group such as a methyl group or an alkenyloxy-containing silyl group at both ends of its molecular chain and having an alkenyloxy group at the side chain of the molecule. These can be used singly or in a combination of two or more thereof.

In said general formula (1) representing said $R^1$, a is an integer of 1 to 8, preferably 2 to 6; b is an integer of 2 to 4, preferably 2 to 3; and c is an integer of 0 to 3, preferably 0 to 2. Incidentally, when a is 0, the curing speed of the resulting composition is down. When a is more than 8, it is not preferable since an advantage caused by the production of the organopolysiloxane is lost.

Specific examples of the $R^1$ include allyloxy, 3-butenyloxy, 4-pentenyloxy, 5-hexenyloxy, 6-heptenyloxy, 7-octenyloxy, 3-butenyloxyethyloxy, 3-butenyloxypropyloxy, 5-hexenyloxyethyloxy, 5-hexenyloxypropyloxy, 7-octenyloxyethyloxy and 7-octenyloxypropyloxy groups.

The monovalent hydrocarbon of $R^2$ includes, for example, an alkyl group such as methyl, ethyl, propyl, isopropyl, butyl, isobutyl, tert-butyl, pentyl, neopentyl, hexyl, heptyl, octyl, nonyl, decyl and dodecyl groups; a cycloalkyl group such as cyclopentyl, cyclohexyl and cycloheptyl groups; an aryl group such as phenyl, tolyl, xylyl, naphthyl and biphenylyl groups; an aralkyl groups such as benzyl, 2-phenylethyl, 3-phenylpropyl and methylbenzyl groups; and a radical obtained by substituting at least part of hydrogen atoms bonded to the carbon atoms of said groups with a substituent, for example, a halogen atom such as fluorine, chlorine and bromine atoms, or a cyano group, said radical including, for example, chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl groups. Among them, typical examples are those having 1 to 10 carbon atoms, particularly 1 to 6 carbon atoms. Preferably in view of properties, at least 80 mole % of $R^2$ is a methyl group.

Methods for producing the organopolysiloxane of component (A) used in the present invention are obvious to a person skilled in the art and include known methods, for example, a method comprising:

either subjecting a chlorosilane represented by the following general formula (2):

$$(R^3)_i SiCl_{4-i} \quad (2),$$

wherein $R^3$ is an alkyl group, and i is 1 or 2, and a hydroxy compound represented by the general formula (3):

$$R^4 OH \quad (3),$$

wherein $R^4$ is a group represented by the following general formula:

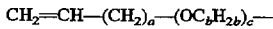

$$CH_2=CH-(CH_2)_a-(OC_bH_{2b})_c-$$

wherein a, b and c are as defined above, to dehydrochlorination in the presence of a HCl-scavenger to synthesize an organosilane represented by the following general formula (4):

$$Si(R^3)_i(R^1)_{4-i} \quad (4),$$

wherein $R^1$, $R^3$ and i are as defined above, or subjecting, for example, a lower alkoxysilane represented by the following general formula (5):

$$(R^3)_i Si(OR^5)_{4-i} \quad (5),$$

wherein $R^5$ is a lower alkyl group such as methyl and ethyl groups, and $R^3$ and i are as defined above, and a hydroxy compound represented by said general formula (3) to ester exchange reaction in the presence of a Lewis acid or a basic catalyst to synthesize an organosilane represented by said general formula (4); and then subjecting the organosilane and, for example, a diorganocyclosiloxane represented by the following general formula (6):

$$[(R^2)_2 SiO]_p \quad (6),$$

wherein $R^2$ is as defined above, and p is an integer of 3 or more, preferably an integer of 3 to 12, to equilibrium reaction in accordance with a usual method to produce said component (A).

As mentioned above, the component (A) can be readily synthesized by the usual method using a silane as a starting material. Further, the above production method does not cause multi-addition as in the conventional production method using an olefin compound as a starting material, so that the component (A) can be obtained at a high yield.

Organohydrogenpolysiloxane (B)

The organohydrogenpolysiloxane of component (B) used in the composition of the present invention is a crosslinking agent for said component (A) and should have at least two hydrogen atoms each bonded to a silicon atom (that is, SiH group), per molecule.

Examples of such an organohydrogenpolysiloxane include a siloxane oligomer such as 1,1,3,3-tetramethyldisiloxane; a cyclic methylhydrogensiloxane such as 1,3,5,7-tetramethyltetracyclosiloxane and 1,3,5,7,8-pentamethylpentacyclosiloxane; a methylhydrogensiloxane blocked with a trimethylsiloxy group at both ends of its molecular chain; a copolymer of a dimethylsiloxane blocked with a trimethylsiloxy group at both ends of its molecular chain and methylhydrogensiloxane; a methylhydrogenpolysiloxane blocked with a silanol group at both ends of its molecular chain; a copolymer of a dimethylsiloxane blocked with a silanol group at both ends of its molecular chain and methylhydrogensiloxane; a dimethylpolysiloxane blocked with a dimethylhydrogensiloxy group at both ends of its molecular chain; a methylhydrogenpolysiloxane blocked with a dimethylhydrogensiloxy group at both ends of its molecular chain; a copolymer of a dimethylsiloxane blocked with a dimethylhydrogensiloxy group at both ends of its molecular chain and methylhydrogensiloxane; and a silicone resin comprised of a $R_2(H)SiO_{1/2}$ unit and a $RSiO_{3/2}$ unit, which can optionally contain a $R_3SiO_{1/2}$, a $R_2SiO_{2/2}$ unit, a $R(H)Si_{2/2}$ unit, a $(H)SiO_{3/2}$ unit or a $SiO_{4/2}$ unit, wherein in said units, R is the same unsubstituted or substituted monovalent hydrocarbon group as one exemplified as said $R^2$. These can be used singly or in a combination of two or more thereof.

The amount of the component (B) to be used is 0.5 to 50 parts by weight per 100 parts by weight of the component (A). Incidentally, if the amount used is too small, the curing speed of the resulting composition may be slow or a film may not be satisfactorily formed when the composition is used for the surface-treatment of various substrates. While, the use of too large an amount may result in causing a curing failure as well as in injuring the physical properties, such as releasability, of the cured product obtained.

Component (C)

The addition reaction retarder of component (C) used in the present invention is an agent for controlling the reaction between said components (A) and (B) at normal temperature and is a component for preventing the composition from becoming impossible to be used.

Examples of such an addition reaction retarder include 3-methyl-1-butyn-3-ol, 3,5-dimethyl-1-hexyn-3-ol, 3-methyl-1-pentene-3-ol, 1-ethynylcyclohexanol, 1,1,3,3-tetramethyl-1,3-divinyldisiloxane, methylvinylcyclotetrasiloxane and benzotriazole. These can be used singly or in a combination of two or more thereof.

The amount of the component (C) to be used can be suitably adjusted depending on the kind of the addition reaction retarder, but may be such an amount that the practical pot life of the resulting composition can be maintained. The amount is generally 0.01 to 10 parts by weight, and preferably 0.1 to 5 parts by weight, per 100 parts by weight of the component (A).

Component (D)

The platinum family metal catalyst of component (D) used in the present invention is a catalyst for accelerating the addition reaction between the vinyl group of said component (A) and the hydrogen atom bonded to the silicon atom of the component (B) and includes catalysts well-known as a catalyst for use in hydrosilylation reaction. Specific examples thereof include a platinum family metal single substance such as platinum (including platinum black), rhodium and palladium; platinum chloride, chloroplatinic acid or salts of chloroplatinic acid, such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$, wherein in said formulas, n is an integer of 0 to 6, and preferably 0 or 6; alcohol-modified chloroplatinic acid (see U.S. Pat. No. 3,220,972); a complex of chloroplatinic acid and olefin (see U.S. Pat. Nos. 3,159,601; 3,159,662; and 3,775,452); a catalyst comprising a platinum family metal, such as platinum black and palladium, supported on a carrier such as alumina, silica and carbon black; rhodium-olefin complex; chlorotris(triphenylphosphine)rhodium (Wilkinson's catalyst); and a complex of platinum chloride, chloroplatinic acid or a chloroplatinic acid salt with a vinyl group-containing siloxane, particularly a vinyl group-containing cyclic siloxane.

The amount of the component (D) to be used varies with the kind of the catalyst, but may be a so-called catalytic amount and is generally 1 to 1,000 ppm, and preferably 10 to 100 ppm, in terms of the weight of a platinum family metal based on the total weight of the component (A) and the component (B). The use of the amount in the above range results in curing the resulting composition by means of heat-treatment in a short time.

Other Components

In addition to said components (A), (B), (C) and (D), an organic solvent may be compounded to the composition of the present invention. If an organic solvent is compounded to the composition, coatability can be improved when the composition is thinly coated on a substrate.

Such an organic solvent may be any solvents dissolving uniformly said components (A) to (D) but not inhibiting the reaction and includes, for example, aromatic hydrocarbons such as toluene and xylene; aliphatic hydrocarbons such as hexane and heptane; esters such as ethyl acetate; and ketones such as acetone and methyl ethyl ketone.

Curable Organopolysiloxane Composition and its Cured Product

The composition of the present invention can be readily obtained by uniformly mixing said components (A) to (D) and other desired components. The mixing method is not particularly limited, but it is advantageous in view of use that the components (A), (B) and (C) are previously mixed and the component (D) is finally mixed therewith.

The cured product of the present invention is obtained by curing said composition. The curing temperature is not particularly limited, but the composition of the present invention is cured even at a temperature of about 80° to 100° C. for a short time. Accordingly, the composition of the present invention is useful as surface-treating agents for providing water repellency and slip properties to various substrates or providing releasability from tacky substances, potting materials and sealants.

EXAMPLES

The present invention will be described in more detail with reference to working examples and comparative examples. Incidentally, in each of these examples, all "part(s)" stand for parts by weight, and all viscosities were measured at 25° C. Further, the pot life test, curability test, peeling resistance test, and residual adhesion test set forth in each of the examples were conducted in accordance with the following methods.

Pot Life Test 100 g of an organopolysiloxane composition obtained in each of the examples was charged into a 20 ml-glass beaker and left to stand at 25° C. with stirring by means of a stirrer to measure days until the torque of the stirrer reached maximum.

Curability Test

An organopolysiloxane composition obtained in each of the examples was uniformly coated on the surface of a polyethylene-coated paper and then heated at 100° C. using a hot air circulation type dryer to measure the time (second) until the composition was completely cured.

Peeling Resistance Test

The organopolysiloxane composition obtained in each of the examples was uniformly coated on the surface of a polyethylene-coated paper in an amount of 0.6 g/m², and then heat-treated at 120° C. for 25 seconds using a hot air circulation type dryer to form a cured film of the composition. Thereafter, an acrylic solvent type prssure sensitive adhesive (produced by Toyo Ink Mfg. Co. Ltd. under the tradename of BPS-5127) or an acrylic emulsion type pressure sensitive adhesive (produced by Toyo Ink Mfg. Co. Ltd. under the tradename of BPW-3110H) was coated on the surface of the cured film and heat-treated at 100° C. for 3 minutes.

Then, a fine paper (free sheet) of 64 g/m² was layered on the pressure sensitive adhesive surface of the cured film, and the resulting laminate was aged at 25° C. for 1 day, followed by cutting the laminate into 5 cm width to prepare test specimens (hereinafter, the test specimens using said acrylic solvent type pressure sensitive adhesive being referred to as test specimen 1, and the test specimens using said acrylic emulsion type pressure sensitive adhesive being referred to as test specimen 2).

While, after said adhesive coated cured film was heat-treated at 100° C. for 3 minutes as mentioned above, it was further heat-treated at 120° C. for 45 minutes. Then, a fine paper of 64 g/m² was layered on the pressure sensitive adhesive surface of the cured film, and the resulting laminate was aged at 25° C. for 1 day, followed by cutting the laminate into 5 cm width to prepare test specimens (hereinafter, the test specimens using said acrylic solvent type pressure sensitive adhesive being referred to as test specimen 3, and the test specimens using said acrylic emulsion type pressure sensitive adhesive being referred to as test specimen 4).

Subsequently, each of test specimens 1 and 2 was measured for a loading (g) when an end of the polyethylene-coated paper and an end of paper layered on said treated surface were pulled in the opposite direction and peeled using a tensile tester. That is, the peeling was carried out in such a manner that the peeling direction (angle) of the polyethylene-coated paper to the paper area layered on said treated surface was 180°. The peeling speed was 0.3 m/min and 60 m/min.

Residual Adhesion Test

A cured film of an organopolysiloxane composition obtained in each of the examples was formed on the surface of a polyethylene-coated paper in the same manner as in said peeling resistance test, except that the curing condition was changed to "for 25 seconds at 120° C.". Then, a pressure sensitive adhesive tape (produced by Nitto Denko Co. Ltd. under the tradename of Nitto 31B) was adhered to the surface of the resulting cured film, followed by heat-treating the tape adhered as above at 70° C. for 20 hours while applying a load of 20 g/cm$^2$ onto the surface of the tape adhered. Thereafter, the tape per se was peeled from the surface of the cured film and again adhered to a stainless steel plate. A loading (g) (hereinafter referred to as a first-measured value) when the tape was peeled from the stainless steel plate using a tensile tester was measured. Incidentally, the peeling was carried out in such a manner that the angle of the surface of the pressure sensitive adhesive tape to the surface of the stainless steel plate was 180° and the peeling speed was 0.3 m/min. Separately, a loading (g) (hereinafter referred to as a second-measured value) when the pressure sensitive adhesive tape was peeled from the stainless steel plate was measured in the same manner as in said method of measuring the first-measured value, except that the cured film formed on the polyethylene surface of the polyethylene-coated paper was replaced with a teflon plate. The percentage of the first-measured value based on the second-measured value was calculated to determine a residual adhesion percentage.

Example 1

25.6 g of tris(5-hexenyloxy)methylsilane and 1,110 g of dimethylcyclosiloxane (a mixture of 3 to 12 oligomers) were subjected to equilibrium reaction in the presence of an alkali to obtain a dimethylpolysiloxane blocked with a 5-hexenyloxydimethylsilyl group at both ends of its molecular chain (the amount of 5-hexenyloxy group contained being 2.0 mole %) (yield: 84%). The dimethylpolysiloxane was an oily substance having a viscosity of 220 cP and had a refractive index of 1,405.

Subsequently, 100 parts of said dimethylpolysiloxane, 2 parts of a methylhydrogenpolysiloxane (viscosity: 25 cP) blocked with a trimethylsilyl group at both ends of its molecular chain, and 1 part of 3-methyl-1-butyn-3-ol were mixed. Then, 100 ppm, in terms of platinum, of chloroplatinic acid divinyltetramethyldisiloxane complex was added to the mixture to prepare a curable organopolysiloxane composition. For the resulting composition, the pot-life test, the curability test, the peeling resistance test and the residual adhesion test were conducted. The results are shown in Tables 1 and 2.

Comparative Example 1

A curable organopolysiloxane composition was prepared in the same manner as in Example 1, except that the dimethylpolysiloxane blocked with a 5-hexenyloxydimethylsilyl group at both ends of its molecular chain, which was used in Example 1, was replaced with a dimethylpolysiloxane blocked with a dimethylvinylsilyl group at both ends of its molecular chain. For the resulting composition, the pot-life test, the curability test, the peeling resistance test and the residual adhesion test were conducted. The results are shown in Tables 1 and 2.

Example 2

42.4 g of tris(7-octenyloxy)methylsilane and 1,110 g of dimethylcyclosiloxane (a mixture of 3 to 12 oligomers) were subjected to equilibrium reaction in the presence of an alkali to obtain a dimethylpolysiloxane blocked with a 7-octenyloxydimethylsilyl group at both ends of its molecular chain (the amount of 7-octenyloxy group contained being 2.0 mole %) (yield: 82%). The dimethylpolysiloxane was an oily substance having a viscosity of 220 cP and had a refractive index of 1.406. A curable organopolysiloxane composition was prepared in the same manner as in Example 1, except that the dimethylpolysiloxane used in Example 1 was replaced with the dimethylpolysiloxane prepared in this Example 2. For the resulting composition, the pot-life test, the curability test, the peeling resistance test and the residual adhesion test were conducted. The results are shown in Tables 1 and 2.

Example 3

25.6 g of bis(5-hexenyloxy)dimethylsilane and 1,110 g of dimethylcyclosiloxane (a mixture of 3 to 12 oligomers) were subjected to equilibrium reaction in the presence of an alkali to obtain a dimethylpolysiloxane blocked with a 5-hexenyloxydimethylsilyl group at both ends of its molecular chain (the amount of 5-hexenyloxy group contained being 1.3 mole %) (yield: 85%). The dimethylpolysiloxane was an oily substance having a viscosity of 330 cP and had a refractive index of 1.405. A curable organopolysiloxane composition was prepared in the same manner as in Example 1, except that the dimethylpolysiloxane used in Example 1 was replaced with the dimethylpolysiloxane prepared in this Example 3 and the amount of the methylhydrogenpolysiloxane was changed from 2 parts to 1.3 part. For the resulting composition, the pot-life test, the curability test, the peeling resistance test and the residual adhesion test were conducted. The results are shown in Tables 1 and 2.

Example 4

34.6 g of tris[β-(3-butenyloxy)ethoxy]methylsilane and 1,110 g of dimethylcyclosiloxane (a mixture of 3 to 12 oligomers) were subjected to equilibrium reaction in the presence of an alkali to obtain a dimethylpolysiloxane blocked with a β-(3-butenyloxy)ethoxydimethylsilyl group at both ends of its molecular chain [the amount of β-(3-butenyloxy)ethoxy group contained being 2.0 mole %] (yield: 84%). The dimethylpolysiloxane was an oily substance having a viscosity of 275 cP and had a refractive index of 1,405. A curable organopolysiloxane composition was prepared in the same manner as in Example 1, except that the dimethylpolysiloxane used in Example 1 was replaced with the dimethylpolysiloxane prepared in this Example 4. For the resulting composition, the pot-life test, the curability test, the peeling resistance test and the residual adhesion test were conducted. The results are shown in Tables 1 and 2.

TABLE 1

| | Curability (sec) | Residual adhesion (%) | Pot life (day) |
|---|---|---|---|
| Example 1 | 11 | 99 | 2 days or more |
| Comp. Example 1 | 16 | 97 | 2 days or more |
| Example 2 | 13 | 96 | 2 days or more |
| Example 3 | 11 | 98 | 2 days or more |
| Example 4 | 14 | 97 | 2 days or more |

TABLE 2

| | Peeling resistance (g/5 cm) | | | | | | | |
|---|---|---|---|---|---|---|---|---|
| | Curing conditions of composition: 120° C. × 25 sec Test specimen 1 | | Curing conditions of composition: 120° C. × 45 sec Test specimen 3 | | Curing conditions of composition: 120° C. × 25 sec Test specimen 2 | | Curing conditions of composition: 120° C. × 45 sec Test specimen 4 | |
| | Peeling speed 0.3 m/min | Peeling speed 6.0 m/min | Peeling speed 0.3 m/min | Peeling speed 60 m/min | Peeling speed 0.3 m/min | Peeling speed 60 m/min | Peeling speed 0.3 m/min | Peeling speed 60 m/min |
| Example 1 | 67 | 320 | 70 | 345 | 16 | 235 | 17 | 260 |
| Comp. Example 1 | 83 | 385 | 53 | 310 | 19 | 240 | 14 | 310 |
| Example 2 | 57 | 420 | 60 | 435 | 14 | 280 | 15 | 260 |
| Example 3 | 45 | 300 | 51 | 275 | 17 | 225 | 16 | 205 |
| Example 4 | 52 | 430 | 53 | 465 | 15 | 280 | 17 | 260 |

As shown in Table 1, the composition of the present invention is very fast in curing speed and is small in changes of the peeling resistance even when the curing conditions such as curing time were changed.

What is claimed is:

1. A curable organopolysiloxane composition comprising:

(A) an organopolysiloxane containing, in its molecule, at least two groups represented by the following general formula (1) directly attached to Si:

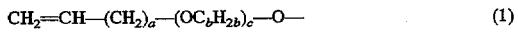

$$CH_2=CH-(CH_2)_a-(OC_bH_{2b})_c-O-\qquad (1)$$

wherein a is an integer of 1 to 8, b is an integer of 2 to 4, and c is an integer of 0 to 3;

(B) an organohydrogenpolysiloxane containing, in its molecule, at least two hydrogen atoms each bonded to a silicon atom;

(C) an addition-reaction retarder; and (D) a platinum family metal catalyst.

2. The composition according to claim 1, wherein the organopolysiloxane of the component (A) is comprised of a $(R^1)(R^2)_2SiO_{1/2}$ unit and a $(R^2)_2SiO_{2/2}$ unit and may contain at least one unit selected from the group consisting of a $R^1R^2SiO_{2/2}$ unit, a $R^1SiO_{3/2}$ unit, a $(R^2)_3SiO_{1/2}$ unit and a $R^2SiO_{3/2}$ unit wherein in said units, $R^1$ is a group represented by the general formula (1), and $R^2$ is an unsubstituted or substituted monovalent hydrocarbon group free of an aliphatic unsaturated bond, said organopolysiloxane containing at least two $R^1$ groups in its molecule.

3. The composition according to claim 1, wherein the group represented by the general formula (1) in said component (A) is selected from the group consisting of allyloxy, 3-butenyloxy, 4-pentenyloxy, 5-hexenyloxy, 6-heptenyloxy, 7-octenyloxy, 3-butenyloxyethyloxy, 3-butenyloxypropyloxy, 5-hexenyloxyethyloxy, 5-hexenyloxypropyloxy, 7-octenyloxyethyloxy and 7-octenyloxypropyloxy groups.

4. The composition according to claim 1, wherein the organopolysiloxane of said component (B) is at least one compound selected from the group consisting of siloxane oligomers; cyclic methylhydrogensiloxanes; methylhydrogensiloxanes blocked with a trimethylsiloxy group at both ends of its molecular chain; a copolymer of a dimethylsiloxane blocked with a trimethylsiloxy group at both ends of its molecular chain and methylhydrogensiloxane; a methylhydrogenpolysiloxane blocked with a silanol group at both ends of its molecular chain; a copolymer of a dimethylsiloxane blocked with a silanol group at both ends of its molecular chain and methylhydrogensiloxane; a dimethylpolysiloxane blocked with a dimethylhydrogensiloxy group at both ends of its molecular chain; a methylhydrogenpolysiloxane blocked with a dimethylhydrogensiloxy group at both ends of its molecular chain; a copolymer of a dimethylsiloxane blocked with a dimethylhydrogensiloxy group at both ends of its molecular chain and methylhydrogensiloxane; and a silicone resin comprised of a $R_2(H)SiO_{1/2}$ unit and a $RSiO_{3/2}$ unit, which may contain a $R_3SiO_{1/2}$, a $R_2SiO_{2/2}$ unit, a $R(H)SiO_{2/2}$ unit, a $(H)SiO_{3/2}$ unit or a $SiO_{4/2}$ unit, wherein in said units, R is an unsubstituted or substituted monovalent hydrocarbon group.

5. The composition according to claim 1, wherein the addition reaction retarder is at least one compound selected from the group consisting of 3-methyl-1-butyn-3-ol, 3,5-dimethyl-1-hexyn-3-ol, 3-methyl-1-pentene-3-ol, 1-ethynylcyclohexanol, 1,1,3,3-tetramethyl-1,3-divinyldisiloxane, methylvinylcyclotetrasiloxane and benzotriazole.

6. The composition according to claim 1, wherein the amount of the component (B) and the amount of the component (C) are 0.5 to 50 parts by weight and 0.01 to 10 parts by weight, per 100 parts by weight of the component (A), respectively, and the amount of the component (D) is 1 to 1,000 ppm, in terms of the weight of platinum family metal, based on the total weight of the component (A) and the component (B).

7. A cured product obtained by curing the composition of claim 1.

* * * * *